Nov. 25, 1969     T. R. SMITH     3,479,803
POCKET-TYPE FILTER
Filed Jan. 23, 1967     2 Sheets-Sheet 1
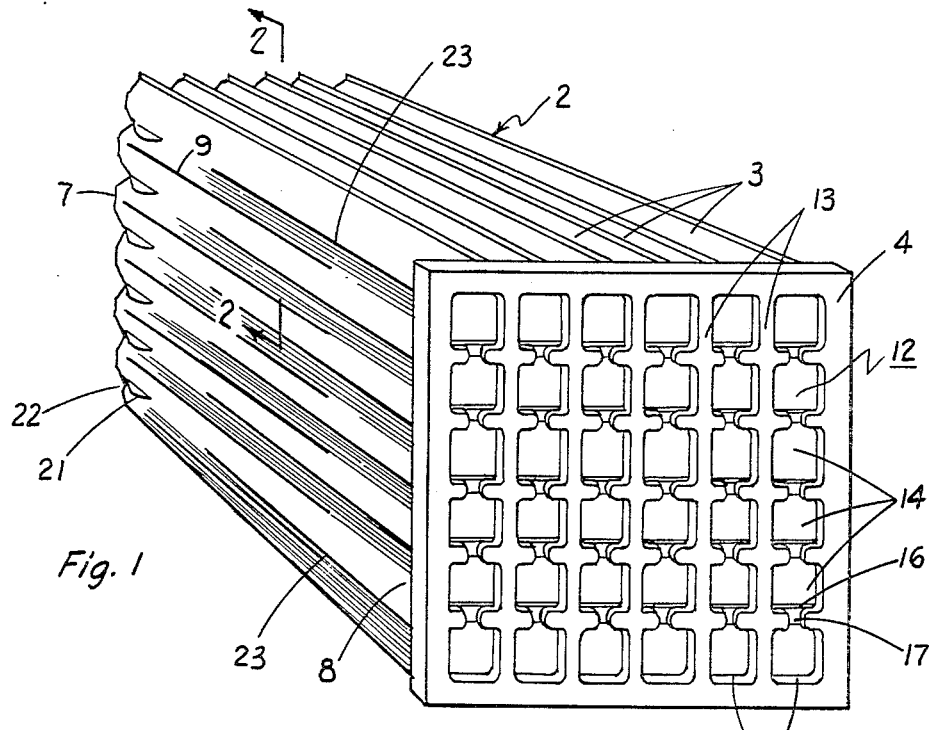
Fig. 1
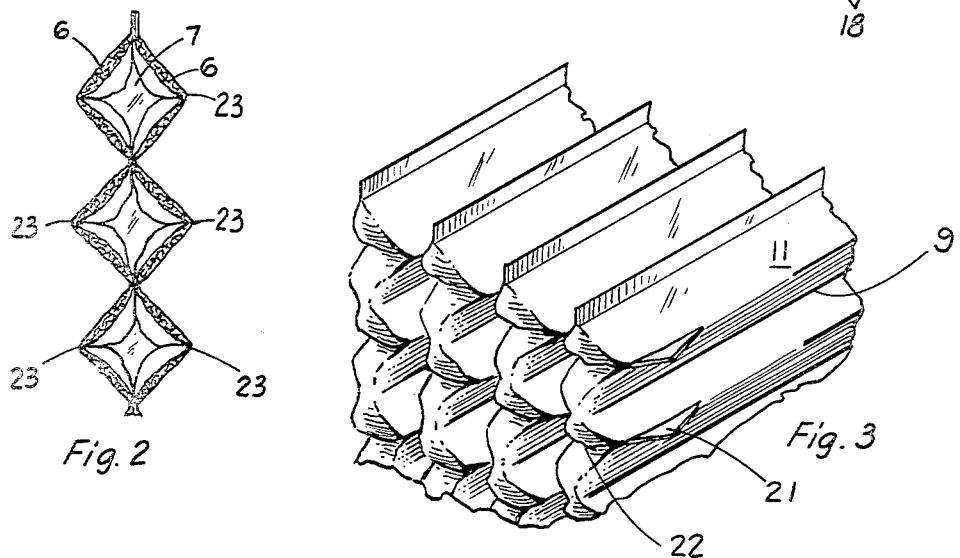
Fig. 2
Fig. 3
INVENTOR.
Tom R. Smith
BY
Ralph B. Bricke Nov. 25, 1969  T. R. SMITH  3,479,803
POCKET-TYPE FILTER
Filed Jan. 23, 1967  2 Sheets-Sheet 2

INVENTOR.
Tom R. Smith
BY
Ralph B. Brick

United States Patent Office 3,479,803
Patented Nov. 25, 1969

3,479,803
POCKET-TYPE FILTER
Tom R. Smith, Louisville, Ky., assignor to American Air Filter Company, Inc., Louisville, Ky., a corporation of Delaware
Filed Jan. 23, 1967, Ser. No. 610,889
Int. Cl. B01d 29/06
U.S. Cl. 55—500    5 Claims

ABSTRACT OF THE DISCLOSURE

An improved pocket-type fluid filter formed from flexible filtering material, the pockets of the filter having preselected indentation lines adjacent the mouth portions to insure proper opening and contouring of such pockets during fluid treating operations and having fold forming means adjacent the downstream end portions to hold the downstream ends in extended open position during fluid treating operations.

BACKGROUND OF THE INVENTION

The present invention pertains to the fluid filtration art and finds particular utility in the gas separation art wherein particulate materials are separated from a gaseous stream.

Various types of fluid filters of the pocket type are known in the art, the filtering material utilized to form the pockets being of either stiff, self-supporting nature such as paper, or of soft, pliant, flexible nature such as a fabric of cloth or spun fibers. Pocket-type fluid filters of the self-supporting type permit ready contouring for operational purposes, but are comparatively less porous and are limited in dust holding capacity, are more vulnerable to rupture, and are not as readily storable. Pocket-type filters of the soft, pliant, flexible nature, on the other hand, have presented contouring problems during filtering operations, either requiring costly to construct and maintain external support devices to shape the pockets or else sacrificing efficiency as a result of improper pocket opening.

SUMMARY OF THE INVENTION

In accordance with the present invention, a new, useful, and unobvious pocket-type filter of soft, pliant, flexible nature is provided which lends itself to ready and economical construction, insuring proper pocket opening during filtering operations to provide efficient fluid filtering. Moreover, the novel assembly of the present invention requires only a minimum of external support, depending upon the unique tuck and fold arrangement and an indentation arrangement integral with the pocket itself to insure optimum formation during fluid treating operations.

Various other features of the present invention will become obvious to one skilled in the art upon reading the disclosure set forth hereinafter.

More particularly, the present invention provides a pocket-type fluid filter comprising: flexible filtering material including a pair of pleat-forming sections joined together in end-to-end fashion along a common line and having terminal supporting portions removed from the common line, the pleat-forming sections being folded to face each other and form a pleat, spaced seams extending across the pleat transverse the common line to join the facing sections of the pleat and form pocket member means having an open-ended upstream mouth immediately adjacent the supporting portions, means cooperable with the supporting portions to maintain the upstream mouth of the pocket member means in open position to receive a fluid stream to be filtered, and fold forming means disposed in the faced pleat-forming sections intermediate the spaced seams and adjacent the common line to form a fold transverse the common line and the longitudinal flow axis of said pocket member so as to hold the downstream end of the pocket member means in extended position. In addition, the present invention provides an indentation line arrangement disposed in opposite faced, pleat-forming sections intermediate the spaced seams and adjacent the mouth of the pocket means to facilitate opening of the mouth and contouring of the pocket member means during filtering operation.

It is to be understood that various changes can be made in the arrangement, form and construction of the apparatus disclosed herein without departing from the scope or spirit of the present invention.

BRIEF DESCRIPTION OF THE DRAWING

Referring to the drawing which discloses one advantageous embodiment of the present invention:

FIGURE 1 is a perspective view of a pocket-type fluid filter assembly incorporating the novel features of the present invention taken from the upstream end of the assembly;

FIGURE 2 is an enlarged, cross-sectional view of a portion of the pockets taken in a plane through line 2—2 of FIGURE 1;

FIGURE 3 is an enlarged, isometric view of a portion of the pocket assembly of FIGURE 1, taken from the downstream end of the assembly;

Referring to FIGURES 1 and 2 of the drawing, there is disclosed a pocket-type fluid filter assembly 2, which assembly includes a plurality of pocket pleats 3 mounted on and supported by an apertured frame 4. The pleats 3 can be formed from any one of a number of known, suitable soft, pliant, flexible filtering materials which are relatively nonstretchable and porous in nature. Advantageously, a nonwoven heat sealable fibrous material can be used. For example, a synthetic polyester fire retardant heat sealable material has been found to be satisfactory for use in accordance with the present invention.

Figure 4:
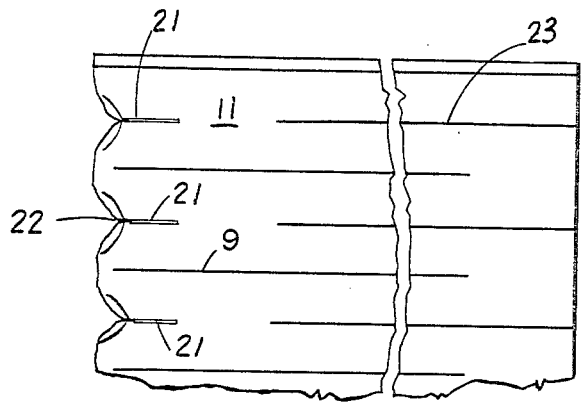
FIGURE 4 is an enlarged, side view of a portion of the pockets of the novel pocket assembly of FIGURE 1.
Figure 5:
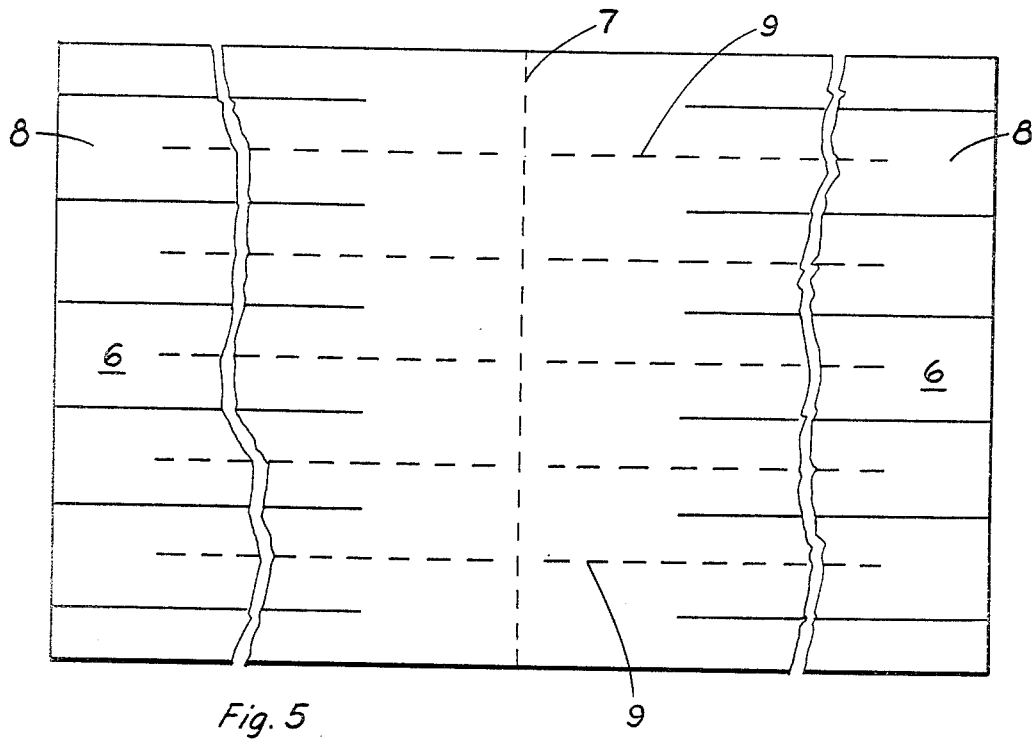
FIGURE 5 is a reduced plan view of a blank utilized to form a pocket pleat of the assembly of FIGURE 1.

Each pleat 3 includes a pair of pleat-forming sections 6 having a downstream midpoint or common fold line 7 about which the pair of pleat-forming sections are folded to face each other and form such pleat. Each of the pleat-forming sections 6 has a terminal supporting portion 8 disposed remote from the midpoint fold line 7. The faced pair of pleat-forming sections 6 are joined together along spaced seams 9 which extend across the pleat transverse midpoint fold line 7 to divide pleat 3 into rows of side-by-side pockets 11. Each pocket 11 has a closed end which is formed adjacent fold line 7 and an open-ended mouth portion formed adjacent terminal supporting portions 8 which form the mouth of the pocket. The pleat-forming sections 6 can be fastened together along seams 9 and along three sides of the periphery of the formed pleat by some suitable fastening arrangement such as sewing, spaced staples, or advantageously, when the material is heat sealable, by a suitable seam-forming heating tool.

To support pleats 3 across a fluid stream to be filtered, aforementioned apertured frame 4 is provided. Frame 4 can be formed from a suitable sheet material by conventional stamping or drawing methods; or, if desired, can be formed from several pieces of rigid material fastened together by welding or like means. Frame 4 is provided with spaced, parallel, longitudinally extending air inlet passages 12 determined by spaced bars 13. The opposed peripheral longitudinal sides of bars 13 along opposite sides of each air inlet passage 12 are contoured to present a plurality of successively opposed crests and valleys so that each air inlet passage 12 is in the nature of a row of spaced apertures 14 formed by the opposed valleys and crests. As illustrated, the narrow channel portions 16 disposed between opposed crests interconnect the apertures 14. These narrow channel portions 16 can be bridged by a thin strip of material as at 17 to strengthen the overall frame structure.

Extending along the periphery of each air inlet passage 12 in the opposed crest and valley contour conforming with the contour of a gas inlet passage periphery is continuous dependent side wall 18. It is to be noted that, in effect, each side wall 18 serves to support by some suitable means such as gluing the terminal supporting portions 8 of a pleat 3. It is further to be noted that the general assembly of the pleats 3 to apertured frame 4 is substantially like that set forth in assignee's Patent No. 3,124,441, issued to R. D. Rivers on Mar. 10, 1964, and, if desired, the pleats can be formed from a simple, continuous web of material as is disclosed in such Rivers patent.

In accordance with the present invention, referring to FIGURE 3 of the drawing, it can be seen that the downstream end portions of the pockets in each of pleats 3 are provided with fold-forming means in the form of material gathering tucks 21. A tuck 21 is provided in each pleat-forming section 3 so as to be disposed on opposite sides of each pocket. Each tuck 21 is arranged to extend substantially parallel spaced pocket-forming seams 9 in a direction transverse common fold line 7, the pair of tucks 21, as positioned in opposite sides of a pocket member 11, serving to form fold 22 which extends transverse pleat fold line 7 and transverse the longitudinal flow axis of pocket 11 to hold the downstream end portions of the pocket 11 in extended open position.

To further insure proper contouring of each pocket 11 during filtering operations, a heat-sealed compressed indentation line 23 is provided in each of the faced, pleat-forming sections 6 to extend substantially parallel spaced pocket-forming seams 9 from the mouth along a portion of the pleat section. To insure desirable opening configuration, indentation lines 23 are aligned with tucks 21 and as the fluid to be treated flows into pocket members 11, the pocket members assume a configuration in keeping with the indentation or weakness lines 23 so as to properly open for fluid-treating operations, spacing adjacent pocket members 11 from each other in preselected fashion to provide maximum filtering efficiency with a minimum of contact between adjacent pockets.

The invention claimed is:

1. A pocket-type fluid filter: including a pair of pleat-forming sections formed of flexible sheet filtering material joined together in end-to-end fashion along a common line and having terminal supporting portions remote from said common line, said pleat-forming sections being folded to face each other and form a pleat, spaced seams extending across said pleat transverse to said common line to join said facing sections of said pleat and form pocket member means having an open end upstream mouth immediately adjacent said supporting portions, means cooperable with said supporting portions to maintain said upstream mouth of said pocket member means in opened position to receive a fluid stream to be filtered, and fold-forming material gathering tuck means disposed in said faced pleat-forming sections intermediate said spaced seams and adjacent said common line to form a fold along only the downstream end of said pocket member means, said fold extending in longitudinal fashion transverse said common line and transverse the longitudinal flow axis of said pocket member means to hold the downstream end of said pocket member means in extended position.

2. The apparatus of claim 1, said flexible filtering material including a heat sealable fiber, said fold forming means comprising material gathering heat sealed tucks oppositely disposed in said faced pleat-forming sections to extend substantially parallel said spaced seams in a direction transverse said common line.

3. The apparatus of claim 1, and indentation weakness lines disposed in said faced pleat-forming sections intermediate said spaced seams and adjacent said mouth to facilitate opening of said mouth and contouring of said pocket member means during filtering operations.

4. The apparatus of claim 3, said flexible filtering material including a heat sealable polyester fiber, said indentation lines comprising heat sealed compression lines oppositely disposed in said faced pleat-forming sections to extend substantially parallel said spaced seams from said mouth along a portion of said pocket means.

5. The apparatus of claim 4, said fold forming means comprising heat sealed tucks oppositely disposed in said faced pleat-forming sections adjacent said common line and aligned with said indentation lines to extend substantially parallel said spaced seams in a direction transverse said common line to form said fold along the downstream end of said pocket member means, said fold extending in longitudinal fashion across said common line and across said longitudinal flow axis of said pocket member means holding the downstream end of said pocket member means in extended position.

References Cited

UNITED STATES PATENTS

| 46,944 | 3/1865 | Rose | 223—28 |
| 2,936,855 | 5/1960 | Allen et al. | 55—498 |
| 2,974,432 | 3/1961 | Warnock et al. | 38—144 |
| 3,025,964 | 3/1962 | Summers et al. | 55—498 |
| 3,124,440 | 3/1964 | Hogg | 55—484 |
| 3,124,441 | 3/1964 | Rivers | 55—500 |
| 3,273,321 | 9/1966 | Bauder et al. | 55—499 |
| 3,276,190 | 10/1966 | Babbitt et al. | 55—341 |
| 3,369,348 | 2/1968 | Davis | 55—381 |
| 3,386,231 | 6/1968 | Nutting | 55—490 |
| 3,386,232 | 6/1968 | Gaines | 55—500 |

HARRY B. THORNTON, Primary Examiner

BERNARD NOZICK, Assistant Examiner

U.S. Cl. X.R.

55—484, 511, 528; 210—493